3,380,376
FRYER BASKET

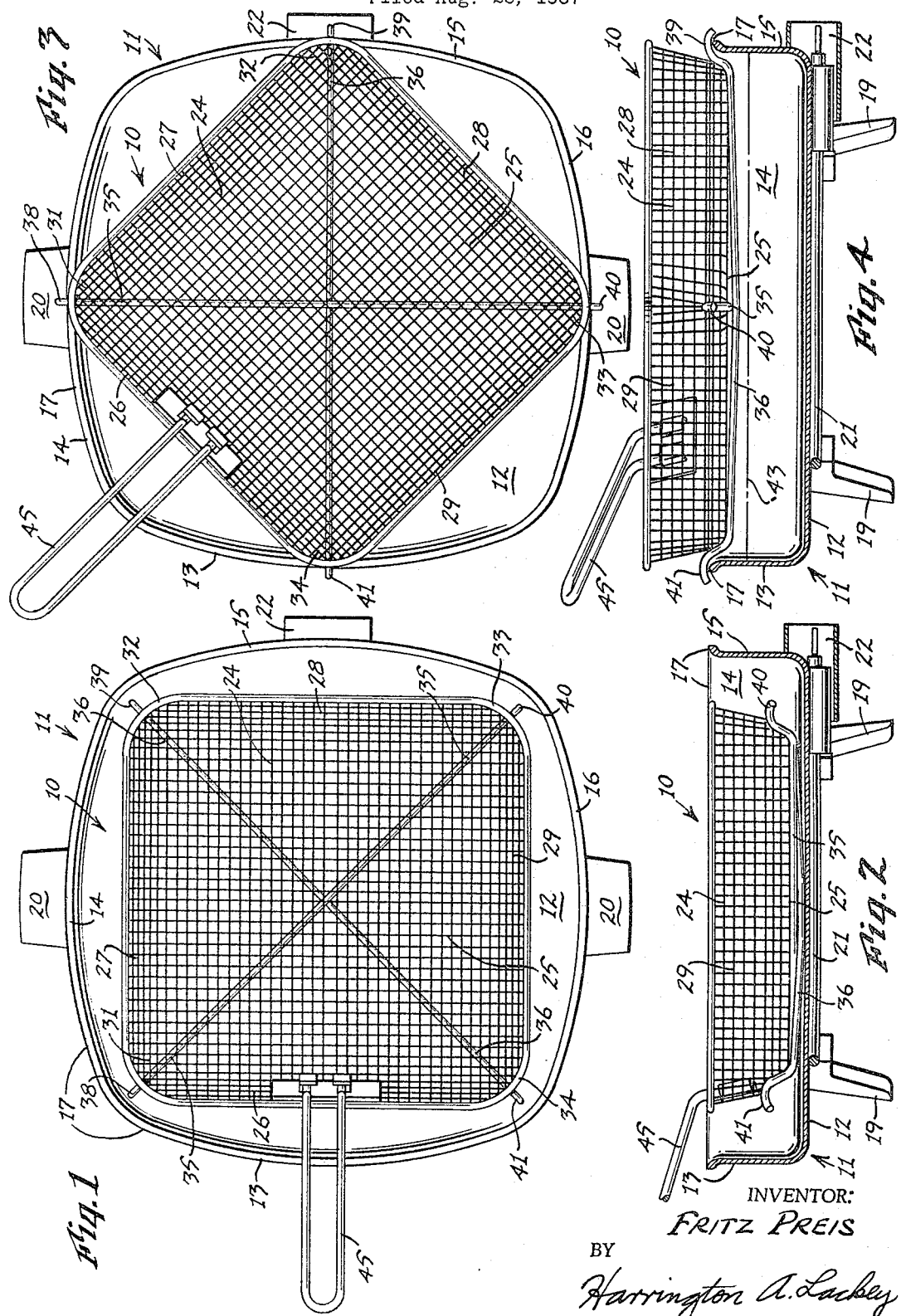

Fritz Preis, Nashville, Tenn., assignor to Lasko Metal Products, Inc., Franklin, Tenn., a corporation of Pennsylvania
Filed Aug. 23, 1967, Ser. No. 662,661
2 Claims. (Cl. 99—413)

ABSTRACT OF THE DISCLOSURE

A fryer basket having four corners, equally spaced diagonally and adjacent each other, and a hook projecting diagonally from each corner, the basket being adapted to be received in frying position within a substantially square frying receptacle, and adapted to be supported upon the rim of the receptacle in a draining position slightly elevated and rotated approximately 45° from the frying position.

Background of the invention

This invention relates to a fryer basket, and more particularly to a fryer basket for a substantially square frying receptacle.

Although circular fryer baskets adapted to be received in larger circular frying receptacles are known, and various devices have been employed for supporting such baskets in order to drain the excess fat or oil from the fried food, nevertheless it is believed that a simple device for supporting a substantially square fryer basket on a substantially square receptacle in a draining position is new.

Summary of the invention

This invention relates to a fryer basket, and more particularly to a fryer basket specifically adapted for being received within and upon a substantially square frying receptacle in selective frying and draining positions.

One object of this invention is to provide a fryer basket having substantially square corners with a hook member projecting diagonally from each corner to engage and seat upon the rim portions of a substantially square frying receptacle, but slightly larger than the fryer basket.

Another object of this invention is to provide a fryer basket which may be quickly and easily maneuvered between a frying position and a draining position relative to a substantially square frying receptacle, and in which the basket is stably supported in either position.

Another object of this invention is to provide a fryer basket which is adapted to be merely elevated and rotated about its center in order to shift it from a frying position to a draining position, without any portion of the bottom wall of the fryer basket projecting beyond a side wall of the frying receptacle.

A further object of this invention is to provide a fryer basket adapted to be selectively shifted between a frying position and a draining position in a frying receptacle, and in which the fryer basket is uniformly supported around its periphery in draining position.

Brief description of the drawings

FIG. 1 is a top plan view of a fryer basket made in accordance with this invention in frying position within a substantially square frying receptacle;

FIG. 2 is a side elevation of the frying apparatus disclosed in FIG. 1, with the receptacle shown in section;

FIG. 3 is a top plan view similar to FIG. 1, but with the fryer basket disclosed in draining position; and FIG. 4 is a view similar to FIG. 2, with the fryer basket disclosed in the draining position of FIG. 3.

Description of the preferred embodiment

Referring now to the drawings in more detail, the fryer basket 10 made in accordance with this invention is particularly adapted for use in cooperation with a substantially square frying receptacle 11, slightly larger than the fryer basket 10. The receptacle 11 disclosed in the drawing is a conventional, shallow-fat frying receptacle having a bottom wall 12 and four side walls 13, 14, 15 and 16 terminating in continuous upper edges or top rims 17 defining an open top. As disclosed in FIGS. 1 and 3, the side walls 13, 14, 15 and 16 are not straight as in a true square, but are slightly arcuate to bulge out at their median portions. Nevertheless, the four walls 13–16 merge in corner portions which are equally spaced apart adjacent each other and diagonally.

The frying receptacle 11 may be supported on legs 19, and be provided with laterally extending handles 20, if desired. Moreover, the receptacle 11 disclosed in the drawings is provided with an electrical heating element 21 and an electrical connector 22, so that when the connector 22 is connected to a suitable electrical conduit, not shown, which is in turn connected to an electrical power source, not shown, the bottom wall 12 will be heated until the cooking fat or oil within the receptacle 11 has been elevated to the desired temperature.

The fryer basket 10 is made of a reticulated material such as wire mesh 24, and also has a bottom wall 25 and four side walls 26, 27, 28 and 29. As disclosed in FIGS. 1 and 3, the side walls 26–29 form a substantially square shape slightly smaller than the substantially square shape of the frying receptacle 11. The side walls 26–29 of the basket 10 merge in four corner portions 31, 32, 33 and 34, each corner being equally spaced from each adjacent corner portion, and opposite corner portions being equally spaced diagonally. Thus, as disclosed in FIG. 1, when the basket 10 is in frying position, the bottom wall 25 of the basket rests adjacent the bottom wall 12 of the receptacle 11. Also the basket side walls 26–29 are disposed in generally parallel and adjacent relationship with the corresponding receptacle side walls 13–16. Consequently, the corner portions 31–34 of the basket 10 are received in the corresponding corner portions of the receptacle 11.

Fixed to the bottom wall 25 of the basket 10 are a pair of elongated support rods 35 and 36. The rods 35 and 36 are of substantially equal length, but fixed at right angles to each other so that each rod 35 and 36 is disposed diagonally of the basket 10. Each extremity of each support rod 35 and 36 projects outwardly and upwardly to form a hook member 38, 39, 40 and 41, all of similar construction and bent concave downwardly to engage any of the top rims 17. The opposed hook members 38 and 40 are formed at the diagonal extremities of support rod 35 corresponding to the basket corner portions 31 and 33, and are spaced apart a distance equal to the median distance between the top rims 17 of the side walls 14 and 16. In like manner, the opposed hook members 39 and 41 of support rod 36 are spaced apart the same distance as the other pair of hook members 38 and 40, which is also equal to the median distance between the top rims 17 of the side walls 13 and 15.

Thus, the construction of the support rods 35 and 36 and the hook members 38–41 forming the extremities of the rods 35 and 36 permit the basket 10 to be supported upon the frying receptacle 11 above the level 43 of the cooking oil or fat, so that the excess oil may drain from the food contents of the basket 10 through the openings in the wire mesh material 24 into the receptacle 11.

In order to manipulate the basket 10 between its frying position disclosed in FIGS. 1 and 2 and the draining position disclosed in FIGS. 3 and 4, a handle member 45 may be fixed to the basket side wall 26, if desired.

The operation of the invention will now become apparent from the drawings and the above description.

The receptacle 11 is supported upon a level surface, such as a table, by legs 19 and filled to approximately the level 43 with cooking oil or fat. The electrical connector 22 is connected through a conduit to an electrical power source in order to energize the heating element 21 and heat the oil within the receptacle 11 to the desired cooking or frying temperature. The food to be fried, such as sliced potatoes, is introduced into the fryer basket 10. The basket 10 is then lowered by the handle member 45 into frying position within the receptacle 10 as disclosed in FIGS. 1 and 2, that is with corresponding sides of the basket 10 and receptacle 11 having similar orientation. When the handle member 45 is released, the bottom wall 25 of the basket 10 will rest upon the bottom wall 12 of the receptacle 11.

After the food contents of the basket 10 are completely fried or cooked, the electrical conduit may be disconnected from the connector 22, and the handle member 45 grasped to elevate the basket 10 straight up relative to the receptacle 11. The handle member 45 is then manipulated to rotate the basket 10 about its center approximately 45° so that the hook members 38–41 are above the top rims 17. The basket 10 is then lowered until each hook member 38–41 engages and seats upon the corresponding middle or median portion of the top rims 17 of each corresponding side wall 13–16. The basket 10 is then in its draining position as disclosed in FIGS. 3 and 4 to drain the excess cooking oil or fat from the contents of the basket 10.

It will be noted in FIGS. 3 and 4 that the hook members 38–41 are uniformly distributed around the periphery of the basket 10 to afford maximum stability for the basket 10 in its draining position. Thus, if the food contents of the basket 10 are disposed closer to one side wall than another, there will not be a tendency for the basket to tip over.

Another important feature of the invention is that the support rods 35 and 36 not only provide a simple and economical method of forming the hook members 38–41, but also provide reinforcing support for the basket bottom wall 25. Furthermore, the support rods 35 and 36 provide a continuous connection between the diagonally opposed hook members 38–40 and 39–41 in order to provide additional strength and stability for the hook members.

It will be apparent to those skilled in the art that various changes may be made in the invention without departing from the spirit and scope thereof, and therefore the invention is not limited by that which is shown in the drawings and described in the specification, but only as indicated in the appended claims.

What is claimed is:

1. A basket for a frying receptacle having a bottom wall, four side walls disposed in a generally square shape and terminating in top rims to define an open top, comprising:
   (a) a reticulated member having a bottom wall and four side walls merging in four corners, said corners being equally spaced adjacent each other and diagonally,
   (b) a hook member fixed to the bottom portion of each corner and projecting diagonally outwardly to engage and seat upon a top rim,
   (c) the distance between each pair of diagonally spaced hook members being equal to the median distance between the top rims of each pair of opposed receptacle side walls,
   (d) said reticulated member being adapted to be wholly received within said frying receptacle in a frying position, in which said bottom walls are adjacent each other, corresponding side walls of said reticulated member and said receptacle are adjacent each other, and said corners are received within the corresponding corners of said receptacle,
   (e) said reticulated member being adapted to occupy a draining position in which said hook members engage the corresponding median portions of said four rims to support said reticulated member elevated and rotated about its center approximately 45° relative to its frying position.

2. The invention according to claim 1 further comprising two elongated rods fixed to said bottom wall of said reticulated member at right angles to each other, each of said rods extending diagonally of said reticulated member, and each extremity of each of said rods forming one of said hook members.

References Cited
UNITED STATES PATENTS

| | | | |
|---|---|---|---|
| Re. 16,355 | 5/1926 | Jamison | 99—413 |
| 211,076 | 12/1878 | Follett | 99—413 |
| 1,688,039 | 10/1928 | Drumm | 99—413 |
| 1,712,161 | 5/1929 | Olson | 99—413 |
| 2,868,112 | 1/1959 | Bushway | 99—410 |

ROBERT W. JENKINS, *Primary Examiner.*